Jan. 5, 1965   J. JACOBSEN   3,164,342
ENGINE MOUNT
Filed June 19, 1962   3 Sheets-Sheet 1

INVENTOR
Johannes Jacobsen

BY *Strauch, Nolan & Neale*
ATTORNEYS

Jan. 5, 1965   J. JACOBSEN   3,164,342
ENGINE MOUNT
Filed June 19, 1962   3 Sheets-Sheet 2

INVENTOR
Johannes Jacobsen

BY *Strauch, Nolan & Neale*
ATTORNEYS
P-775

Jan. 5, 1965  J. JACOBSEN  3,164,342
ENGINE MOUNT
Filed June 19, 1962  3 Sheets-Sheet 3

INVENTOR
Johannes Jacobsen

BY *Strauch, Nolan & Neale*

ATTORNEYS
P-775

United States Patent Office 3,164,342
Patented Jan. 5, 1965

3,164,342
ENGINE MOUNT
Johannes Jacobsen, San Diego, Calif., assignor to Solar Aircraft Company, San Diego, Calif., a corporation of California
Filed June 19, 1962, Ser. No. 203,537
3 Claims. (Cl. 248—3)

The present invention relates to engine mounts, and more particularly to a mount for supporting a gas turbine engine on a non-rigid or flexible base.

Gas turbine engines generally are supported upon a rigid base such as a heavy steel frame, a concrete slab, or some other immovable structure. The customary supporting means is a mount that consists of a trunnion assembly and a single link, which are spaced from each other along the engine housing with the single link centered at the forward end. The trunnion assembly and the single link provide a three point support that is adapted by ball and socket connection of the single link to allow for thermal expansion and contraction of the engine. The trunnion assembly absorbs output torque reaction, i.e., forces generated by operation of the engine per se and transmitted through the engine housing.

If a non-rigid base such as the hull of a ship or body of a truck is to be used for supporting the engine, the above described mount is not satisfactory, since the single link cannot transfer horizontal acceleration forces.

It is a primary object of this invention to provide a mount that prevents twisting and bending of a supported body caused by flexing of the base upon which the body is mounted.

It is a further important object of this invention to provide a mount that comprises fore and aft mounting assemblies for mounting a gas turbine engine upon a non-rigid or flexible base and absorbing the lateral twisting and bending forces of the base as well as the reaction torque forces due to engine operation.

Another object is to provide a mount which achieves the primary object and which relieves the engine housing of torque forces when transverse vertical and horizontal acceleration forces are applied to the engine housing and/or the base upon which the mount rests.

Still another object is to provide a gas turbine engine mount that satisfies the foregoing objects and allows for thermal expansion and contraction of the engine.

A further object is to provide a gas turbine engine mount comprising longitudinally spaced mounting assemblies that are capable of minimizing the transverse forces applied to the engine housing, the mount providing a yielding linkage between the engine housing and the base when there is a twist or sidewise deflection of the base at one mounting assembly relative to the other mounting assembly.

Yet a further object is to provide a gas turbine engine mount including a yielding linkage that may be disposed between the engine housing and a base at any point ahead of a rear trunnion mount to free the housing from twisting and bending forces caused either by flexing of the base or operation of the engine, the mount being adapted also to allow for thermal expansion and contraction of the engine.

Still another object is to provide a gas turbine engine mount that has both forward and rear mounting assemblies, yet allows for thermal expansion and contraction of the engine and precludes torque forces which otherwise would occur and be applied to the engine housing.

A further object of this invention resides in the provision of a gas turbine engine mount that comprises first and second mounting assemblies spaced longitudinally along the engine housing, the first assembly being a linkage system made up of two links end connected to the base at widely laterally spaced points by universal connections and end connected to the engine housing by universal connections spaced therearound to dispose the longitudinal axes of the two links to intersect the center of gravity line of the engine preferably at a common point and the second assembly being a trunnion assembly fixed to the base with its trunnion axis passing through the engine center line at the point of intersection thereof by the center of gravity line of the engine.

Further objects will appear from the following description and appended claims when read in conjunction with the accompanying drawings wherein;

Figure 1:
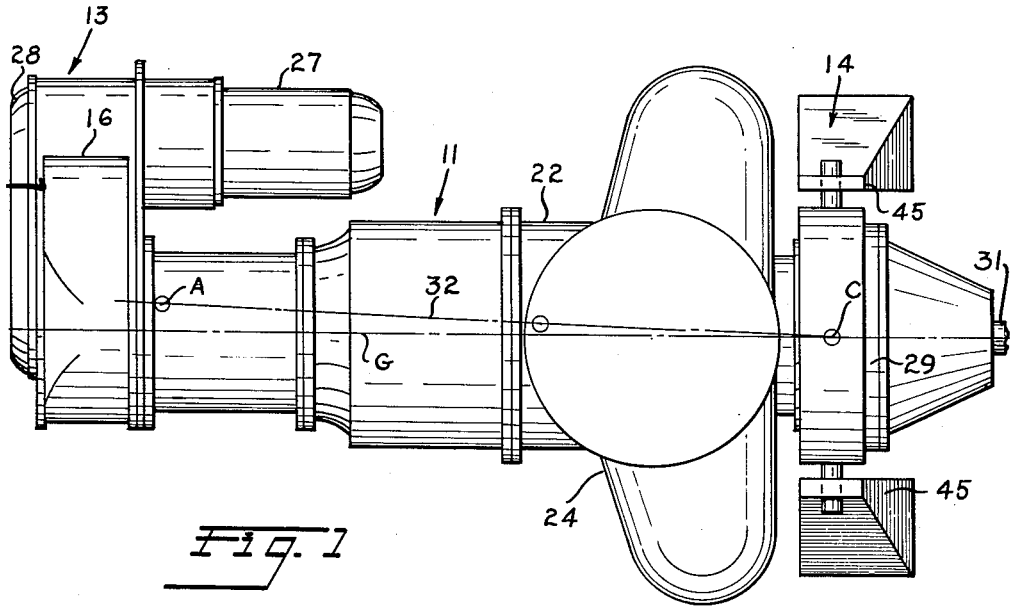
FIGURE 1 is a plan view of a turbine engine embodying front and rear mounting assemblies in accord with this invention, the front assembly being at the left end and the rear assembly being at the right end of this figure.

With continued reference to the drawings wherein like reference numerals are employed throughout the several views to designate the same parts, numeral 11 generally refers to a gas turbine engine, 12 is a non-rigid base, such as the deck or floor plates of a ship's hull upon which the engine is supported, 13 is a first or front mounting assembly and 14 is a second or rear trunnion mounting assembly.

The engine conventionally comprises a housing assembly made up of a compressor air inlet section 16, a multistage compressor 17, a combustion chamber 18, a turbine 22 and diffuser section 24, the latter connected rearwardly to the gear housing 29 which is supported by the second or rear trunnion mounting assembly 14. At the front end of the engine 11, an accessory drive 28 is provided in customary manner, supported by the engine. At the rear end of the engine 11, the reduction gear box 29 and a main power output shaft 31 are provided, also in conventional manner.

Supporting structure of the engine assembly is provided by the outer casings of the various components except for the diffuser section 24, which has an outer shell of sheet metal surrounding an inner shell, the latter apertured to allow turbine exhaust gas to flow to the exhaust stack. Thus, the diffuser section is the weakest link in the support structure.

Figure 2:
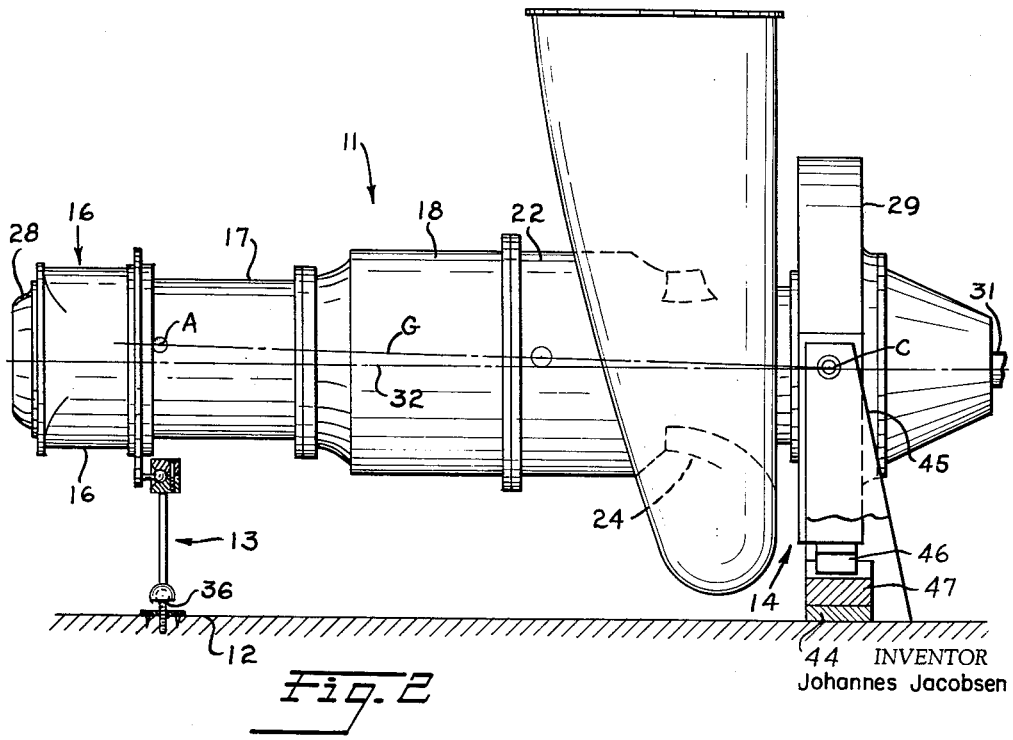
FIGURE 2 is a right side elevational view of the turbine engine mounting assemblies of FIGURE 1.
Figure 3:
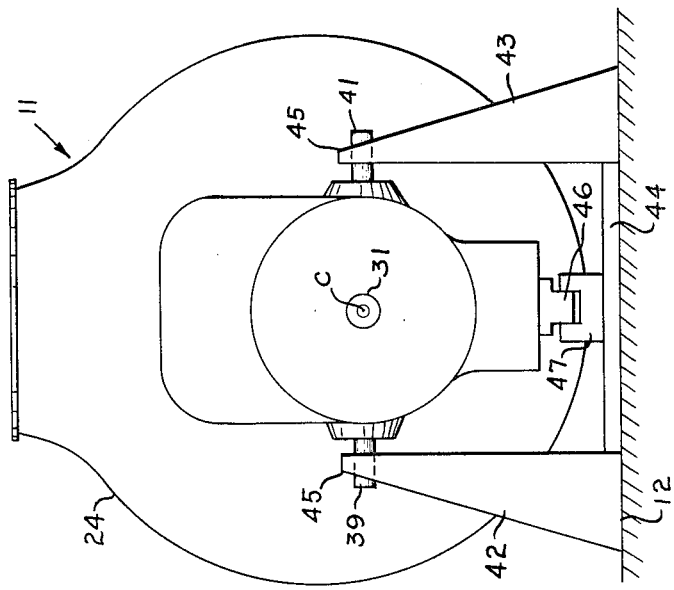
FIGURE 3 is an end elevational view of the rear or right hand end of the structure shown in FIGURES 1 and 2.
Figure 4:
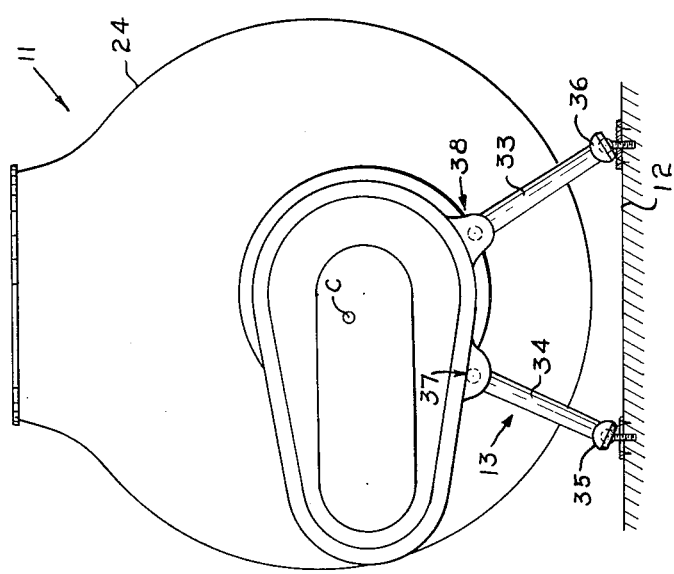
FIGURE 4 is an end elevational view of the forward or left hand end of the structure shown in FIGURES 1 and 2.

In FIGURES 1 and 2 the numeral 32 indicates the center line of the engine. This line is coincident with the axes of the compressor 17 and the turbine 22 and the power output gear (not shown) in gear box 29. At the front of the compressor 17, where it attaches to the air inlet 16, a local center of gravity point displaced from the center line 32 and lying at the point of intersection of the longitudinal axes of links 33 and 34 of a pair of links of front mounting assembly 13 is indicated at A. At the rear end of the engine 11, a local center of gravity point, determined by the intersection of the rear mounting assembly trunnion axis and the engine center line 32, is designated C. A line G connecting these center of gravity points establishes a center of gravity line for the turbine engine.

The base 12, being deck or floor plates of the hull of a boat or, for a further example, the frame of a truck, is relatively flexible. Therefore, the connecting points between the base and links 33 and 34 of the front mounting assembly 13 are constantly flexing relative to each other and the connecting points of the base with the rear mounting assembly 14. This flexing would produce a torque moment or bending force on the engine housing elements of substantial magnitude unless the engine mount is effective to absorb these flexing deflections. This is accomplished in the mount of this invention through the front mount assembly acting in conjunction with the rear trunnion mount 14.

The front mounting assembly 13 constitutes a four-bar linkage that has two links 33 and 34 supported at one end upon the base at laterally spaced points by ball and socket connections 35 and 36. At the other end of links 33 and 34 ball and socket connections 37 and 38 respectively, connect the engine housing to the links. While these connections may be formed in any suitable way, they preferably comprise and are shown as standard ball and socket joints. They, however, may be formed in any suitable way to achieve a universal joint action providing freedom of motion between the links and the engine on the one hand and the links and the base on the other hand.

The links 33 and 34 are first and second bars of the four-bar linkage. The base 12 forms a third bar connection between the links at one end, and the engine housing 11 forms a fourth bar connection between the other ends of the links.

In accordance with this invention, the axes of the links 33 and 34 intersect local center of gravity points along the center of gravity line G, preferably the common center of gravity point determined by disposing links 33 and 34 with their axes in a common laterally directed plane. Conceivably, the axes of links 33 and 34 might lie in different laterally directed planes to intersect different local center of gravity points along center of gravity line G without departing from the spirit of this invention so long as the longitudinal spacing therealong is selected to confine the points of connection to a rigid length of the engine housing. Furthermore, in some applications it may be desirable to locate the links in planes not necessarily perpendicular to the engine axis, but rather in planes at different angles to the engine axis.

The lengths of the links 33 and 34 are shown as being different. They could be equal. Actually these lengths are determined by the cross section profile of the engine housing in the plane of the links. They also are determined by the profile of the base 12. In other words, the lengths of the links 33 and 34 are dictated by the distance from their attaching points on the engine housing 11 to their attaching points on the base 12 and the slope of the lines through the centers of the connection of the links to engine housing 11 and base 12 to assure the intersection of the slope lines with the center of gravity line.

The rear mounting assembly 14 includes a pair of trunnions 39 and 41, which are rigidly attached to opposite sides of the engine housing 11 in coaxial alignment to define a transverse rotational axis normal to and intersecting the engine center line 32 at center of gravity point C. This trunnion axis assures that distortions of the base will not result in bending of the engine structure in a vertical plane. Further, the trunnions transfer the torque reaction from the engine to the base. Mounting assembly 14 also includes a U-shaped supporting bracket consisting of a pair of upstanding laterally spaced arms or pillow blocks 42 and 43 preferably integrally formed on a base 44 that is attached to base 12.

Trunnions 39 and 41 ride in suitable bearings (not shown) supported by laterally aligned semicircular bearing seats in the upper ends of arms 42 and 43 and secured in place by caps 45. Trunnions 39 and 41 may slide laterally within their bearings to permit radial thermal expansion and contraction of the engine housing.

Projecting downwardly from the bottom of the engine housing 11 at its lateral center is a centering key 46 provided for axially slideably cooperating with the slot of a longitudinally directed keyway 47. The key 46 and the keyway 47 center the engine housing 11 so that its center line lies midway between pillow blocks 42 and 43. The keyway 47 is adapted to slide vertically upon the key 46 to permit radial thermal expansion and contraction of the engine housing. It will be appreciated that the key and keyway may be reversed as to location, if desired.

In accordance with this invention, the front mounting assembly 13 cooperates with the rear mounting assembly 14 to provide a yielding mount that relieves the engine housing 11 of twisting or bending torque forces incident to deflections of the flexible, non-rigid base 12 as well as operation of the engine itself. This will be best understood from a consideration of the schematic illustrations of FIGURES 5 and 6.

Figure 5:
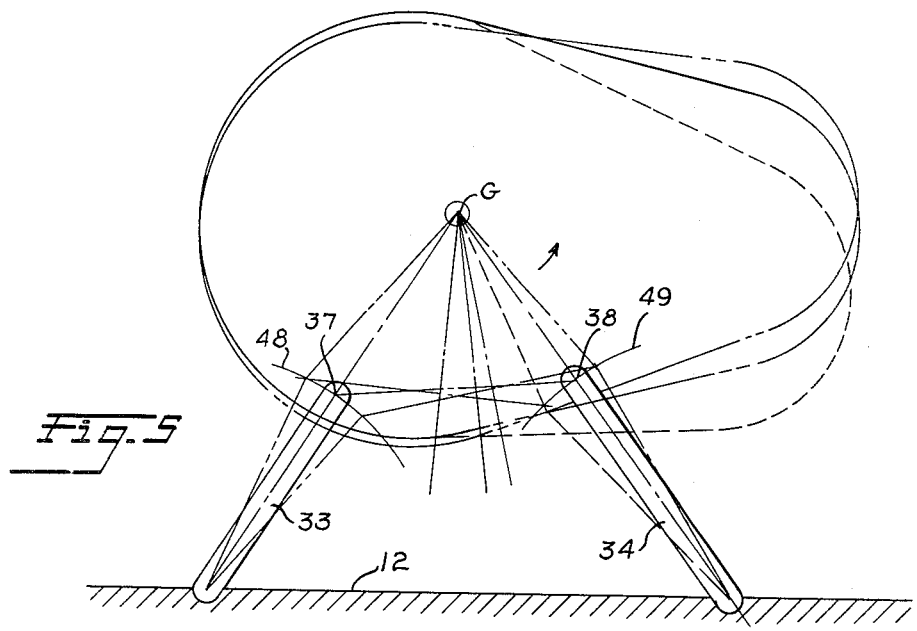
FIGURE 5 is a schematic illustration showing the positions assumed by the front mounting assembly under twisting of the engine and rear trunnion mounts in relation to the front mount.

In FIGURE 5, where the lines of deflection are exaggerated for illustration purposes, three positions for each of the links 33 and 34 are shown for three different rotational positions of the engine housing 11, for example, induced by engine operation or lateral flexing of the base at the rear mounting assembly. Such flexing tends to raise one trunnion and lower the other imparting torque moments to the rear of engine housing 11. The forces acting through housing 11 impart correlative movement to the pivot connections 37 and 38 for the forwardly disposed front mount links 33 and 34 around center of gravity line G. Due to the ability of links 33 and 34 of the four bar front mount linkage to swing laterally, this correlative movement of pivot connections 37 and 38 is not resisted. As a consequence, pivot connections 37 and 38 move along respective arcuate paths 48 and 49 with the links acting as respective radii terminating at the centers of their respective connections 35 and 36 to base 12 in either direction from their normal static positions shown in solid lines in FIGURE 5. Since the points 37, G, 38 in FIGURE 5 define a rigid triangle in which the sides 37–G and 38–G at all times intersect the center of gravity line, it will be appreciated that the front mount effectively absorbs these torque forces permitting the engine to rotate around its center of gravity line as a unit. Consequently, no bending or twisting forces are imposed on the engine housing itself by the operational forces of the engine or relative movement of the trunnions due to flexing of the base in the area of the rear mount.

Figure 6:
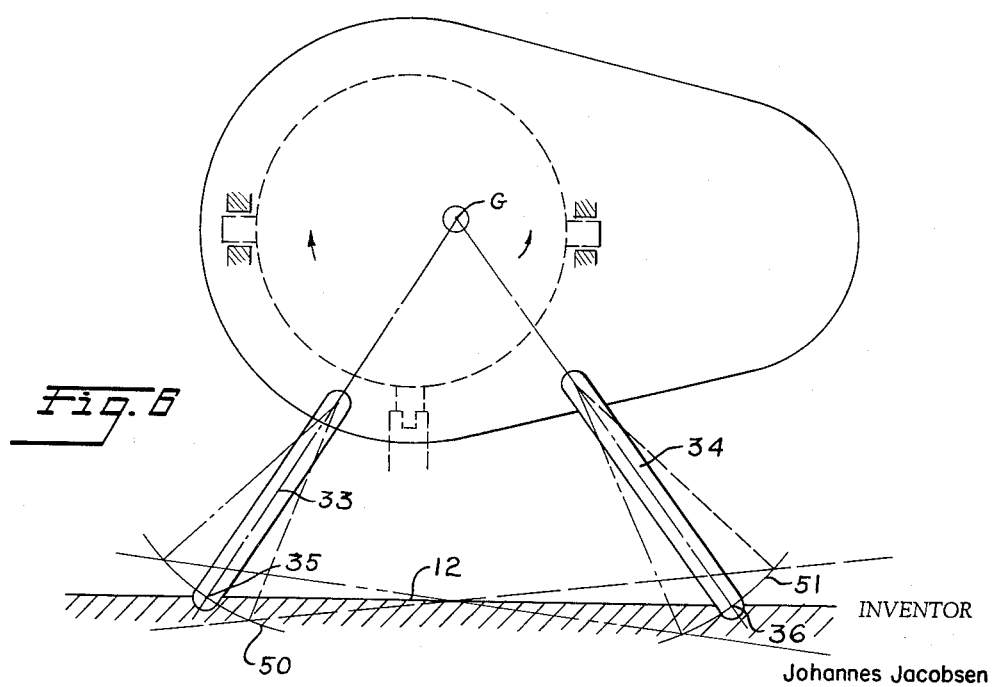
FIGURE 6 is a schematic illustration showing the positions assumed by the front mounting assembly under twisting and horizontal deflection of the supporting base in relation to the trunnion mounts.

In FIGURE 6, where the lines of deflection are similarly exaggerated, three positions for each of the links 33 and 34 are shown for three different positions of the base connections 35 and 36 induced by flexing of the base 12 in the region of front mount 13. These different positions are disposed along respective arcuate paths 50 and 51 with the links acting as respective radii terminating at the centers of their respective connections 37 and 38. It is seen that the links 33 and 34 here again swing, this time about their connections 37 and 38 to permit unrestricted movement of base connections 35 and 36. As a consequence, the four bar linkage front mount 13 effectively absorbs this flexing of base 12 without transmitting torque forces to the engine housing 11. Similarly, the links 33 and 34 swing about their pivot points to absorb the deflections caused by relative lateral shifting of front mount 13 and rear mount 14 or other deflections that tend to impose lateral bending forces between longitudinally spaced sections of the engine housing.

From FIGURE 5 and FIGURE 6, it is apparent that the mount of this invention permits relative movement between the engine housing 11 and its support base 12 without subjecting the housing to twisting or bending forces. Therefore, the housing 11 need not resist the torque forces imposed by such relative movements of the base and engine where prior art mountings are used and conventionally designed gas turbine engines can be used upon a non-rigid or flexible base as well as rigid bases without fear of engine housing failures due to the much greater torque stresses applied to the engine housing as a result of flexing of the support base, particularly in the relatively weak areas such as the exhaust diffuser section of a conventional gas turbine engine.

Additionally, the mount of this invention provides a stable linkage system that is well adapted to handle loadings of the order of thirty-five (35) "G's" directed vertically and horizontally through point A, the apex of a triangle formed by the centerlines of links 33 and 34 intersecting the center of gravity line at A and the base 12. This result is obtained since such forces applied at apex A are transmitted straight through to the hull or foundation through links 33 and 34 along the centerlines forming the aforesaid triangle without measurable deflection, except for compression of the metal forming the sides of the triangle. Thus, when such vertical and horizontal forces are transmitted through the front mount 13 there is no pivoting of the links and no destructive torque moments are applied to the engine housing. The included angle at the apex of this triangle may be varied as desired by shortening or lengthening the links to meet variations in anticipatable vertical and horizontal loads. For example, if the anticipatable vertical loads will be expected to exceed the corresponding anticipatable horizontal loads an included angle between 60° and 80° would be selected. If the anticipatable vertical and horizontal loads of substantial equal values are to be expected, a 90° included angle would be chosen. Similarly, an increase above 90° for the included angle would be chosen if it could conceivably happen that the anticipatable horizontal loads would exceed the vertical loads, a not wholly inconceivable possibility in the hull structure of a large ship or in a situation where the base connections 35 and 36 are located at substantially different levels along the base surface.

The engine mount comprising the forward and rear mounting assemblies 13 and 14 also is adapted to allow for thermal expansion and contraction of the engine housing 11. This is achieved because the trunnions 39 and 41 of the rear mounting assembly 14 are slidable laterally in their bearings and the keyway 47 is slidable vertically and longitudinally upon key 46 to permit radial expansion and contraction of the housing 11 and longitudinal elongation and contraction. Radial expansion and contraction at the front mount 13 is assured by the universal connections for links 33 and 34.

With the mount comprising the forward and rear mounting assemblies as described above, it is not necessary that the front mount 13 be at the extreme forward end of the engine housing. The front mount may be located at any convenient position forward of the rear trunnion mounting 14.

The invention may be embodied in other specific forms without departing from the spirit or essential characteristics thereof. The present embodiment is therefore to be considered in all respects as illustrative and not restrictive. The scope of the invention being indicated by the appended claims rather than by the foregoing description, and all changes which come within the meaning and range of equivalency of the claims are therefore intended to be embraced therein.

What is claimed and desired to be secured by Letters Patent is:

1. In combination, a turbine engine having a longitudinal centerline and a center of gravity line extending at an angle to said centerline; and an engine mount for so mounting said engine on a flexible base as to avoid transmission to the engine of twisting and bending stresses induced by the flexing of said base comprising first and second assemblies for supporting said engine upon said base, the respective assemblies being located at spaced points along said base and at the forward and rear ends of said turbine engine; said second assembly comprising trunnion mount means including two independent trunnions fixed to opposite sides of said engine and extending horizontally therefrom with their longitudinal axes aligned and intersecting the center of gravity line of said engine and a pair of upstanding, laterally spaced pillow blocks rotatably journalling said trunnions, said first assembly comprising a pair of substantially inextensible links, first nondeformable link connections connecting said links at one end to said base at laterally spaced points, and second nondeformable link connections connecting the opposite ends of said links at laterally spaced points to said engine, the relative disposition of said first and second link connections being such that the longitudinal axes of said links intersect said center of gravity line, and said connections being ball and socket connections having their centers lying in a common, laterally related plane and disposed in related pairs at opposite sides of said engine to thereby constrain the relative movement between said links and said base and said links and said engine to free pivotal movement.

2. The combination set forth in claim 1, wherein said trunnions are dimensioned to be axially slidable in said pillow blocks and further including a key and a keyway assembly interposed between said engine and said base of said U-shaped support to center said engine between said pillow blocks, said key and keyway permitting rotational displacement of said engine about the axis of said trunnions and permitting thermal expansion and contraction of said engine at said second assembly.

3. The combination set forth in claim 1, wherein a first plane determined by said trunnion axis and the longitudinal center line of said engine generally parallels a second plane containing the points of connection between said flexible support base and said trunnion mount means and said first support assembly and said common laterally related plane is normal to said first and second planes thereby assuring a normal parallel relationship between said engine and its connections to said support base.

References Cited by the Examiner

UNITED STATES PATENTS

| | | | |
|---|---|---|---|
| 1,682,317 | 8/28 | Allen | 248—19 X |
| 1,753,722 | 4/30 | Schaum | 248—2 |
| 1,918,490 | 7/33 | Riley | 248—7 |
| 2,135,394 | 11/38 | Geissen | 248—8 |
| 2,864,573 | 12/58 | Olley | 248—9 |
| 3,036,375 | 5/62 | Schlosser | 248—23 X |

CLAUDE A. LEROY, *Primary Examiner.*